(12) United States Patent
Hall

(10) Patent No.: US 7,249,239 B1
(45) Date of Patent: Jul. 24, 2007

(54) USING RUN-TIME GENERATED INSTRUCTIONS IN PROCESSORS SUPPORTING WIDER IMMEDIATE ADDRESSING THAN REGISTER ADDRESSING

(75) Inventor: Andrew Hall, High Wycombe (GB)

(73) Assignee: Altera Corporation, San Jose, CA (US)

( * ) Notice: Subject to any disclaimer, the term of this patent is extended or adjusted under 35 U.S.C. 154(b) by 341 days.

(21) Appl. No.: 10/882,455

(22) Filed: Jun. 30, 2004

Related U.S. Application Data

(60) Provisional application No. 60/534,939, filed on Jan. 7, 2004.

(51) Int. Cl.
*G06F 12/00* (2006.01)
*G06F 13/00* (2006.01)
*G06F 13/28* (2006.01)

(52) U.S. Cl. .................. 711/170; 711/166; 711/172

(58) Field of Classification Search ................ 711/170, 711/166, 172, 212
See application file for complete search history.

(56) References Cited

U.S. PATENT DOCUMENTS

| 5,903,772 A | * | 5/1999 | White et al. .................. 712/33 |
| 6,952,754 B2 | * | 10/2005 | O'Connor et al. .......... 711/125 |
| 2005/0055539 A1 | * | 3/2005 | Pechanek et al. ........... 712/207 |

* cited by examiner

*Primary Examiner*—Reba I. Elmore
(74) *Attorney, Agent, or Firm*—Beyer Weaver LLP

(57) ABSTRACT

The processor typically uses address registers having a particular bit width to access lines within an address space. The bit width limits the address space to a particular size. Techniques are provided for expanding the allowed address bit width and the corresponding address space size by using immediate addressing. Mechanisms allow the run time generation of instructions that can access an array of addresses of varying size, providing a way of implementing address spaces that are not limited by the bit width of address registers.

26 Claims, 6 Drawing Sheets

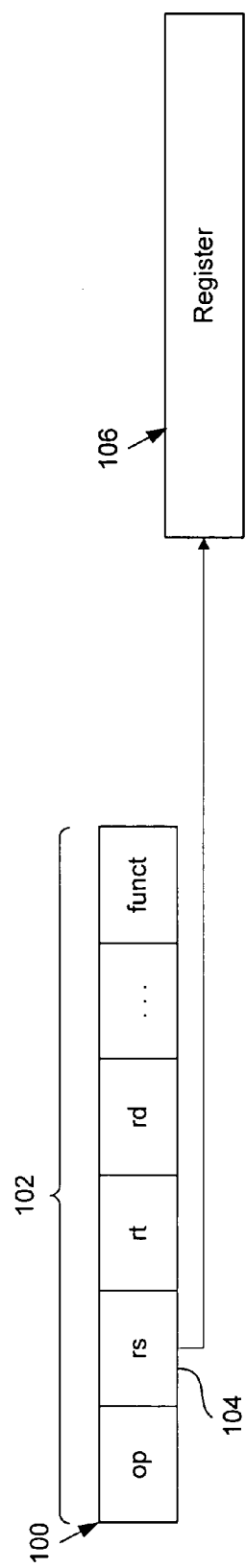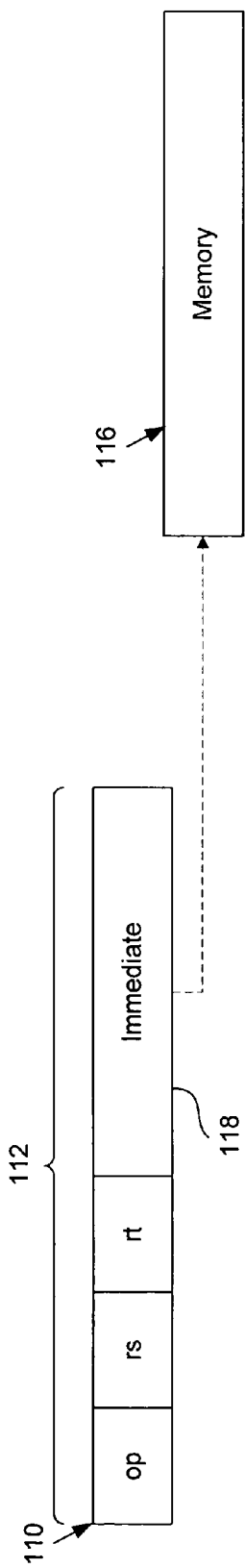
Figure 1A
Figure 1B

USING RUN-TIME GENERATED INSTRUCTIONS IN PROCESSORS SUPPORTING WIDER IMMEDIATE ADDRESSING THAN REGISTER ADDRESSING

CROSS-REFERENCE TO RELATED APPLICATIONS

This application claims benefit of priority under 35 U.S.C. 119(e) of (i) U.S. Provisional Application No. 60/534,939 filed Jan. 7, 2004 and titled "Using Run-Time Generated Instructions In Processors Supporting Wider Immediate Addressing Than Register Addressing," the entirety of which is incorporated by reference for all purposes.

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to processors and associated address spaces. More specifically, the present invention relates to methods and apparatus for a processor to access address spaces of varying size.

2. Description of Related Art

Processors use address registers to access lines in an associated address space. The address registers can be configured with particular bit widths. Using smaller address registers and a corresponding smaller address space allows for the implementation of a smaller and less expensive processor. However, using larger address registers and a corresponding larger address space allows for a processor that can potential handle more data simultaneously. Where processor core size can be critical, such as on programmable chips, smaller address registers are often used.

Furthermore, data and functions are often stored in different memories or in different parts of the same memory. The sizes of these memories may vary. In conventional processors, program and data memories are often implemented on a single device. However, in digital signal processing (DSP) processors, program and data memories are frequently implemented on separate devices with separate buses. The program and data buses may have differing bit widths. Accordingly, the registers accessible by the processor core may have different bit widths.

Some processors (e.g., embedded processors) have restrictions on address register width in order to improve speed and resource utilization. Typically, the restriction imposed on address register width is used as a general restriction on address width accessible by the processor. However, the instruction set may offer a greater address range using immediate addressing. It is therefore desirable to provide improved methods and devices for generating code (e.g., instructions) that can take advantage of the larger address space even when the address space is limited by address register bit widths.

SUMMARY OF THE INVENTION

The processor typically uses address registers having a particular bit width to access lines within an address space. The bit width limits the address space to a particular size. Techniques are provided for expanding the allowed address bit width and the corresponding address space size by using immediate addressing. Mechanisms allow the run time generation of instructions that can access an array of addresses of varying size, providing a way of implementing address spaces that are not limited by the bit width of address registers.

Some embodiments of the invention provide a chip such as a programmable device. The chip includes a processor core with a plurality of registers. Some registers have a first bit width and some registers have a second bit width greater than the first bit width. Data memory and program memory are coupled to the registers of the processor core via a data pathway having a third bit width greater than the first bit width. The processor core is operable to use immediate addressing, also referred to herein as direct addressing, to access memory addresses having the third bit width. Furthermore, the invention provides techniques and mechanisms for a compiler to generate code that can take advantage of the wider address space.

In one aspect, the invention provides a programmable chip that includes a processor core; a plurality of registers having a first bit width, the plurality of registers associated with the processor core on the programmable chip; and memory coupled to the processor core. The memory is configurable to have an address space using a second bit width greater than the first bit width. The processor core is operable to use direct addressing to access memory addresses having the second bit width upon generating an instruction during run-time that uses direct addressing.

In another aspect, the invention provides a method for accessing memory by a processor core. The method includes (a) allocating space in memory that can be accessed by both program buses and data buses of the processor core; (b) generating an instruction in the allocated space during run-time, wherein the instruction includes an immediate value; (c) executing the instruction; and (d) returning data extracted by the instruction when the instruction is determined to be a read instruction.

In yet another aspect, the invention provides a programmable chip that includes a processor core; a plurality of registers having a first bit width, the plurality of registers associated with the processor core on the programmable chip; and memory coupled to the processor core. The memory is configurable to have an address space using a second bit width greater than the first bit width. The processor core includes means for accessing memory addresses having the second bit width with an instruction generated during run-time.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 1A is a diagrammatic representation of register addressing according to various embodiments of the present invention.

FIG. 1B is a diagrammatic representation of immediate addressing according to various embodiments of the present invention.

DETAILED DESCRIPTION OF SPECIFIC EMBODIMENTS

Figure 1C:
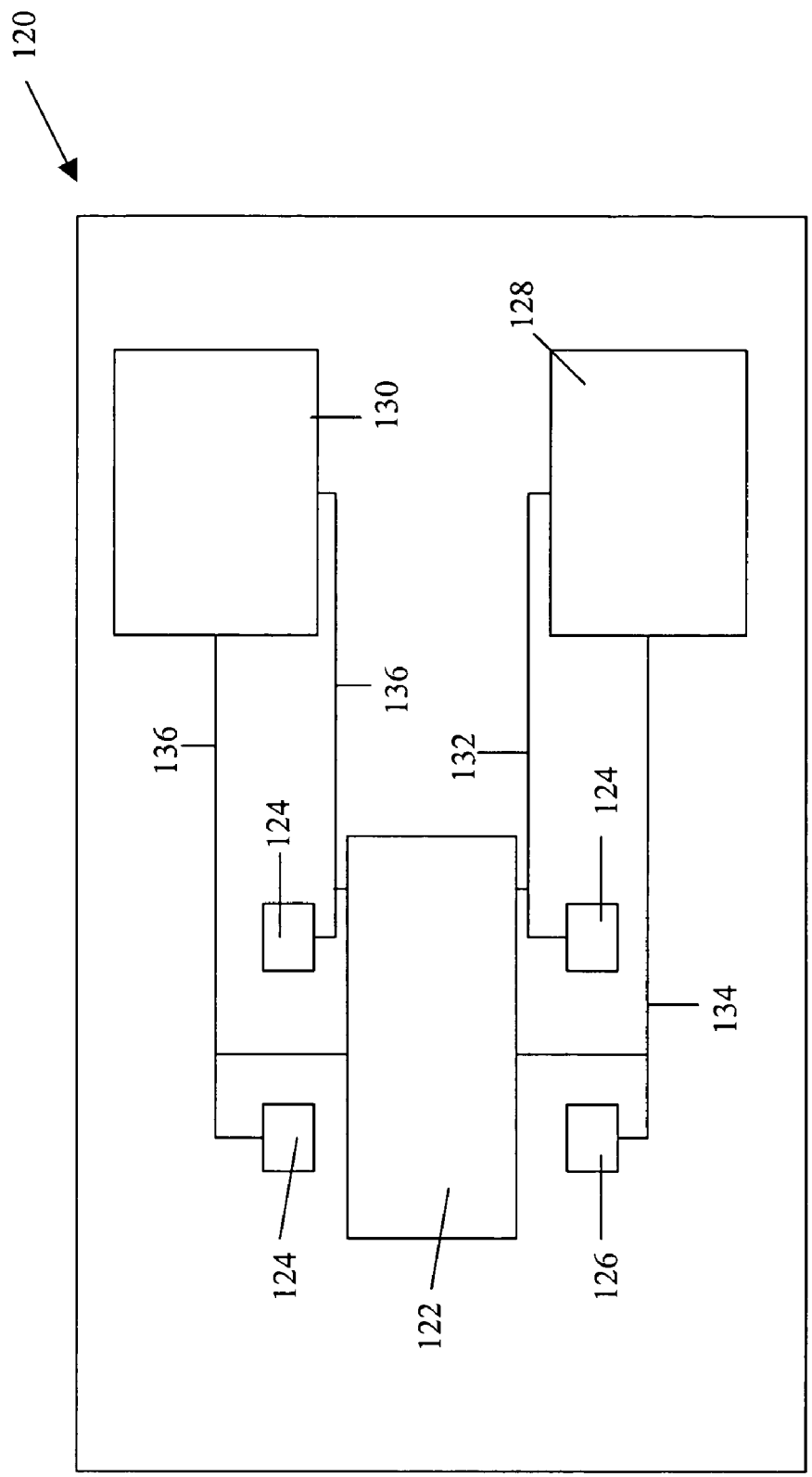
FIG. 1C is a block diagram showing a system with on-chip memory.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processor cores.

However, it should be noted that the techniques of the present invention can be applied to a variety of types of devices. In the following description, numerous specific details are set forth in order to provide a thorough understanding of the present invention. The present invention may be practiced without some or all of these specific details. For example, while much of the following description pertains to programmable chips, the present invention applies to both programmable and non-programmable chips. In other instances, well known process operations have not been described in detail in order not to unnecessarily obscure the present invention.

Conventional processors use various mechanisms to access an address space. In many examples, processors use address registers or immediate addressing to access lines in an address space. When a processor uses address registers to perform read or write operations on lines in an address space, the accessible address space is limited to the size of the address register, e.g. 16-bits, 32-bits.

Processors can also use immediate addressing to access an address space. However, accesses to an address space using immediate values typically need to be resolved at compile time. Consequently, immediate addressing does not offer the same flexibility as register-based accesses. Examples of run-time resolved addresses are stack operations associated with function calls. The run-time addresses are stored in one or more registers and are not able to make use of immediate addressing.

Some processors have a mode of operation in which the address registers have a first bit width, but also have an instruction set that offers immediate addressing using a second and larger bit width. By generating read/write instructions having the second number of bits at run time, it is possible to offer memory accesses to the regions outside of the addressable range of the address registers. The processor core size can be small (this is heavily dependant on address register width), yet the accessible memory space can be reasonably large.

A processor's mode of operation may correspond to a particular addressing mode, which is a method of specifying the operands for a machine code instruction. That is, addressing modes refer to how to specify the location of an operand. In general, an operand is a quantity, value, or thing upon which a mathematical operation is performed.

Figure 3:
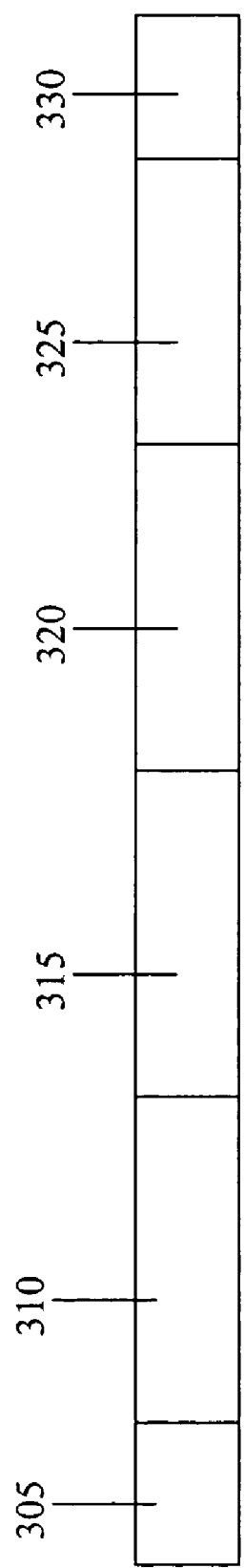
FIG. 3 is a diagrammatic representation of an instruction format that may be used to implement some aspects of the invention.

A processor may provide multiple addressing modes. For instance, one addressing mode is known as register addressing. Referring to FIG. 1A, a machine code instruction 100 implementing register addressing is illustrated. Instruction 100 may include any number of fields 102 for any particular instruction set used by a processor. The fields may be arranged according to a variety of different instruction formats, for example, as illustrated in FIG. 3. As shown in FIG. 1A, one of the fields 104 is used to indicate a register source operand. In other words, field 104 provides the contents of a register location or a reference (e.g., address; encoding) to a register where the operand can be found. In register addressing, the operand is typically stored in a specified register 106.

Another addressing mode is known as immediate addressing, also referred to herein as direct addressing. FIG. 1B illustrates a machine code instruction 110 implementing immediate addressing. As shown, instruction 110 also includes multiple fields 112. However, in contrast to instruction 100 in FIG. 1A, instruction 110 includes a field containing an immediate operand/value 118. That is, the operand is contained within the instruction itself or referenced (e.g., addressed) to a location in memory 116. In other words, if a source operand is part of the instruction or referenced to the contents of a memory instead of the contents of a register, it represents an immediate operand/value 118 and is accessed using immediate addressing mode. Typically, immediate operand/value 118 represents constant data. Further, immediate operands/values can be either a byte or word of data. Immediate addressing may be used in different instructions including, but not limited to, loads, compares, Arithmetic Logic Unit (ALU) operations, etc.

Addressing modes typically affect the number of instruction counts, the average clock cycles per instruction (CPI), or complexity of building a machine run by a processor. Consequently, certain operations may be better performed using one addressing mode over another. For instance, a program may include the use of constants in performing a mathematical operation. The constants may be made available for use in many ways. One way can be provided with immediate addressing. In this case, providing instructions in which the operand contains the constant within the instruction itself. This is in contrast to having the constant retrieved/loaded from a register, which may require more processor resources (e.g., time to access registers). Operands that represent constants may occur frequently in a program, and by making the operands part of the instructions, execution is much faster than if the operands were retrieved/loaded from registers. As such, immediate addressing is faster in this aspect as compared to register addressing since the value to be retrieved/loaded is included in the instruction. However, since the value to be retrieved/loaded is typically fixed at compile-time, immediate addressing is limited in flexibility.

In some cases, immediate addressing may provide a wider bit width in the instruction or referenced memory than there is with a register. As such, the present invention provides methods and apparatus for generating run-time instructions that can access values with larger bit widths by using immediate addressing. Therefore, the present invention allows the flexibility of accessing values outside the addressable range of the address registers. Moreover, since immediate addressing can be used to provide larger bit widths access, address registers need not increase their bit widths; thereby, the processor core size, which typically correlates with the widths of the address registers, can remain relatively small. In addition, by keeping the address registers small in bit width, data accesses by the processor can remain faster in registers than in memory, which is consistent with many common processor architectures.

FIG. 1C is a diagrammatic representation showing one example of a system 120 on a programmable chip, according to one embodiment of the invention. System 120 includes processor core 122, a plurality of registers 124 and 126, data memory 128 and program memory 130. Although data memory 128 and program memory 130 are shown as separate memories in FIG. 1C, in some embodiments of the present invention data memory 128 and program memory 130 are part of a single on-chip memory.

Processor core 122 may include any logic or mechanism known by those of skill in the art for supporting an instruction set. In one example, processor core 122 is a Central Processing Unit (CPU) or a digital signal processing DSP core having Arithmetic Logic Units (ALUs) and Multiply Accumulate Blocks (MACs). In one example, a digital signal processor is a configurable signal processor (CSP).

Processor core 122 can access information in registers 124 and 126, and information in memories 128 and 130. Having memory on-chip allows relatively fast memory read and write access by processor core 122. Registers 124/126 and memories 128/130 may have any appropriate storage capacity. However, keeping the registers and/or data memory smaller requires fewer of the available resources of a processor. Accordingly, relatively small registers and/or data memory are desirable in certain implementations, e.g., for programmable chips.

Data bus 132 may have a different bit width from that of data bus 134. In this example, data bus 134 has a larger bit width than that of data bus 132. In one embodiment, registers 124 are 16-bit registers, register 126 is a 32-bit resister, data bus 132 has a 24-bit width, data bus 134 has a 32-bit width and program bus 136 has a 24-bit width. The number of registers 124 and 126 shown in FIG. 1C is purely illustrative. For example, it will be appreciated by those of skill in the art that there would normally be a plurality of registers 126.

It should be noted that system 120 can include both on-chip and off-chip memory. Moreover, a variety of other on-chip and off-chip components may be part of system 120, but these are not directly pertinent to the present invention and therefore are not shown in FIG. 1C.

The programmable chip uses different types of resources that can be interchangeably used in different allocations to implement the system on a programmable chip. In one example, the programmable chip uses logic elements for implementing each of the various components on the programmable chip. Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

In one embodiment, system 120 offers 2 modes of operation, using 16-bit or 32-bit address registers respectively. The 32-bit address register mode allows access to a relatively large amount of memory. However, this access is provided at the expense of resource utilization in the target programmable chip. The processor uses the same instruction set in both modes, offering memory read/write operations using address registers as well as immediate values. When using memory read/write operations with address registers, the accessible memory space is restricted to the size of the address register, i.e. 16-bits or 32-bits accordingly. For memory read/write operations using immediate values (e.g., where the address is encoded in the instruction), both modes offer access to a 24-bit memory space.

Traditionally, accesses to memory using immediate values need to be resolved at compile time. Therefore, such memory accesses do not offer the same flexibility as register-based accesses. Examples of run-time resolved addresses are stack operations, used for and by function calls. The addresses are stored in registers (pairs of registers for 24/32-bit address accesses in one implementation) and are not able to make use of immediate addressing.

Figure 2:
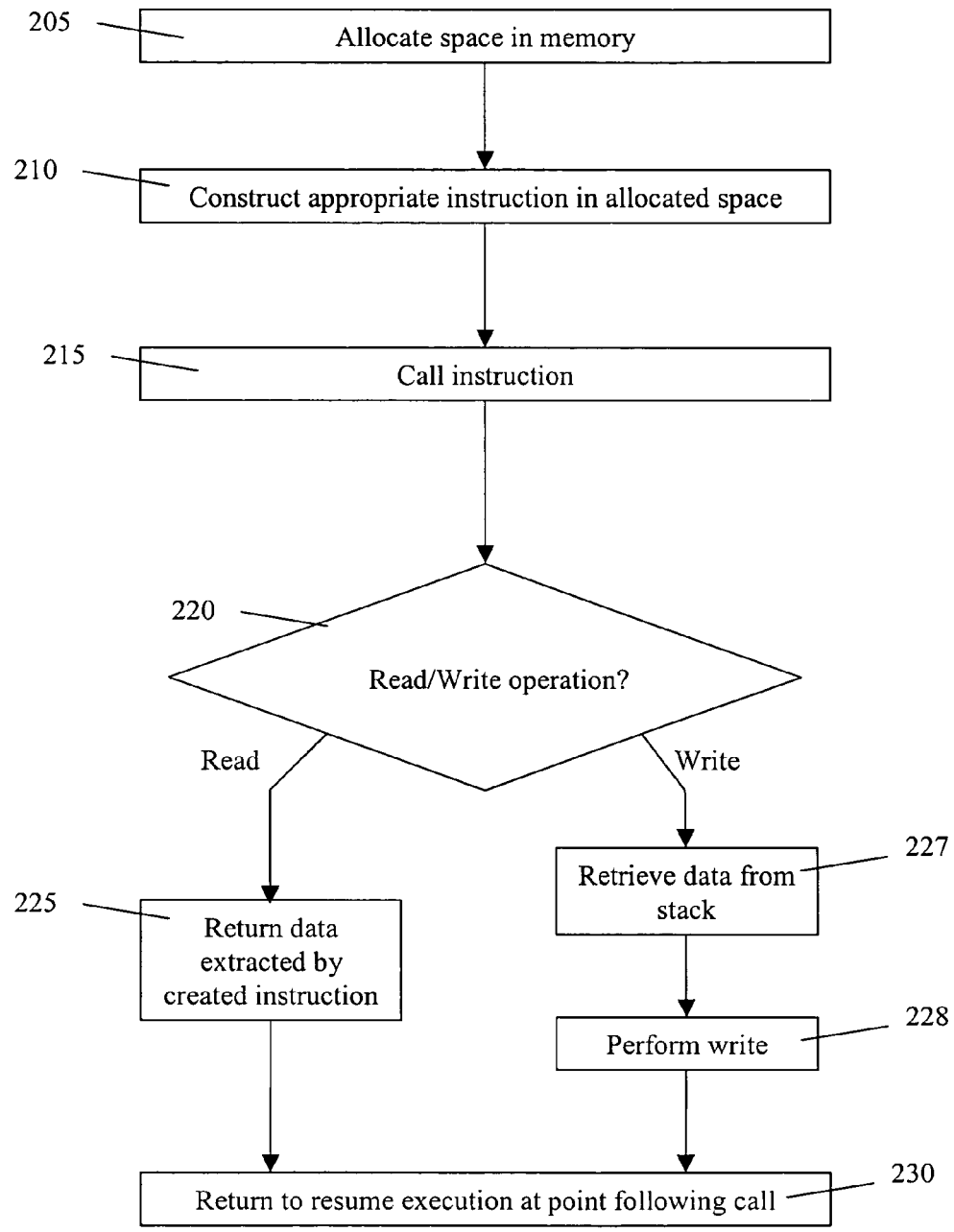
FIG. 2 is a flow chart outlining a method that may be used to implement some aspects of the invention.

One exemplary method according to the present invention will now be described with reference to FIG. 2. According to this method, instructions may be generated to access any available address using immediate values, where the instructions are generated at run time by the processor core.

In step 205, space is allocated in memory that can be accessed by both program and data buses of the processor, preferably on-chip memory. The amount of space needed is sufficient to contain at least a single read/write-using-immediate instruction and a return instruction (or a similar instruction) to allow execution to resume from the calling function.

In step 210, within the extended space read or write function, an appropriate instruction is constructed in the space allocated in step 205. The instruction contains the appropriate immediate value, which is extracted from registers.

In step 215, a call is made to the newly-created instruction. In step 220, it is determined whether the instruction is a read or a write instruction. For read operations, the data extracted by the created instruction is returned in step 225. For write operations, the data for the write is retrieved from the stack in step 227 and the write is performed in step 228. The return instruction will then ensure that execution resumes at a point following the call (step 230).

Exemplary code for performing certain aspects of the present invention will now be set forth below. By implementing various codes, a 16-bit address register version of a processor core is able to access a 24-bit memory space, trading core size for run-time of the memory access. This method is particularly advantageous in a programmable chip, wherein core size may be critical.

Although various codes may be implemented according to a specific application, the following exemplary codes are applicable to performing general case memory accesses in 16-bit mode for a digital signal processing DSP core. A first portion of the code generally includes set-up code for a compiler, such as in the following ".section.text":

.section .text
    ; declare functions, for access from C code
    .global _csp_mem_read16
    .type _csp_mem_read16, @function
    .global _csp_mem_write16
    .type _csp_mem_write16, @function A next section may include a memory read for a 16-bit architecture to allow 24-bit immediate addressing, such as in the following "_csp_mem_read16" routine:

_csp_mem_read16:
    ; r1, r0 is 32-bit address to read from
    ; return r0 is the value read
    ; if r1 is zero, address is <16-bits so we can use address registers to
    ; do the read
    CMP.eq r1, 0
    [F] JMP easy_read_16
    ; Set to read—0x0E08 is encoding for a read using immediate addressing
    MOV d2, 0x0E08
    ; construct the read (using immediate addressing) instruction
    CALL csp_merge_instruction
    ; do the read (into d0)
    CALL csp_access_ins
    done_read_16:
    ; copy result into r0
    MOV r0, d0
    ; All done
    RET Here, r1, r0 is a 32-bit address to read from. If r1 is zero, the address is less than 16 bits and address registers may be used to perform the read. Therefore, the process jumps to "easy_read_16," which performs a regular read from a 16-bit address. Example code for "easy_read_16" is shown as follows:

easy_read_16:
    ; address fits in an address reg—faster
    MOV a0, (0x0, r0)
    LD d0, [a0]
    JMP done_read_16

Referring back to the "_csp_mem_read16" routine, if r1 is not zero, setting up encoding for a read instruction using immediate addressing is performed. As such, a coded procedure "csp_merge_instruction" is called. "csp_merge_instruction" creates a new instruction at run-time for a 24-bit read. The new instruction can be created using any suitable technique. As shown in the following example code for the "csp_merge_instruction" procedure, various extraction techniques are used to create the new instruction.

csp_merge_instruction:
    ; Only difference between
    ; LD d0, [immed24] (0xE000 0E08 0800 0000)
    ; and
    ; ST d0, [immed24] (0xE000 0D88 0800 0000)
    ; is in 2nd highest part of instruction
    ; therefore base of 2nd highest part of insn passed in d2
    ; All of the funny extraction code below just forms the instruction
    ; CSP has particularly odd bit ordering for immediates Extracting the lower 11-bits to d0 is performed in constructing the instruction as follows:

; extract lower 11 bits to d0
    AND d0, r0, 0x07FF
    OR d0, d0, 0xE000; merge with base instruction
    ; write to highest part of instruction
    ST [csp_access_ins+6], d0

Extracting the middle 3-bits to d0 is now performed in constructing the instruction as follows:

; extract middle 3 bits to d0
    AND d0, r0, 0x3800
    ; Shift left by 2
    ADD d0, d0, d0
    ADD d0, d0, d0
    OR d0, d0, d2; merge with base instruction
    ; write to 2nd highest part of instruction
    ST [csp_access_ins+4], d0

Next, extracting the upper 10-bits to d0 is performed in completing the instruction as follows:

; extract upper 10-bits to d0
    ; 2 bits from r0
    AND d0, r0, 0xC000
    ; Shift right by 14—taken from cookbook
    MOV d1, 14
    BGENL d1, d1
    MULI.x2.uu mac0, d0, d1; logical shift
    MOV d0, mac0.hi
    ; 8-bits from r1
    AND d1, r1, 0x00FF
    ; Shift left by 2
    ADD d1, d1, d1
    ADD d1, d1, d1
    ; Merge into d0
    OR d0, d0, d1
    OR d0, d0, 0x0800; merge with base instruction
    ; write to 2nd lowest part of instruction
    ST [csp_access_ins+2], d0
    RET The new instruction is then accessed by a call to another procedure "csp_access_ins", which carries out the appropriate read, storing the value into d0. This value is then copied into register r0 and the "_csp_mem_read16" routine as shown earlier above completes. An example of the "csp_access_ins" procedure is as follows:

; The section below must sit in the lower 23 bits of memory
    ; if CSP is sat on a >24-bit data bus, or anywhere if CSP is
    ; on a <=24-bit bus
    ; The memory must be accessible through both program and
    ; data busses
    .section .text
    csp_access_ins:
    .align 8
    .long 0; lower 32-bits of insn
    .long 0; upper 32-bits of insn
    RET A similar write sequence may also be accessed by a coded routine. An example coded routine for employing the write sequence is the following "csp_mem_write16" routine:

_csp_mem_write16:
    ; r1, r0 is 32-bit address to read from
    ; value to write is on the stack

```
; if r1 is zero, address is <16-bits so we can use address
    registers to
; do the read
CMP.eq r1, 0
[F] JMP easy_write_16
; Set to write—0x0D88 is the encoding for a write using
    immediate
; addressing
MOV d2, 0x0D88
; construct the write (using immediate addressing) instruc-
    tion
CALL csp_merge_instruction
; Get the value to write from the stack
LD d0, [a7+6]
; do the write
CALL csp_access_ins
done_write_16:
; All done
RET
```

"_csp_mem_write16," is a memory write for a 16-bit architecture to allow 24-bit immediate addressing. Again, r1, r0 is a 32-bit address to read from. The value to write is on the stack. If r1 is zero, the address is less than 16 bits and address registers may be used to perform the write. Therefore, the process jumps to "easy_write_16," which performs a regular write from a 16-bit address. Example code for "easy_write_16" is shown as follows:

```
easy_write_16:
; address fits in an address reg—faster
MOV a0, (0x0, r0)
LD d0, [a7+6]
ST [a0], d0
JMP done_write_16
```

Referring back to the "_csp_mem_write16" routine, if r1 is not zero, setting up encoding for a write instruction using immediate addressing is performed. As such, a coded procedure "csp_merge_instruction" is called. "csp_merge_instruction" creates a new instruction at run-time for a 24-bit write. The new instruction can be created using any suitable technique. As shown in the following example code for the "csp_merge_instruction" procedure, various extraction techniques are used to create the new instruction.

```
csp_merge_instruction:
; Only difference between
; LD d0, [immed24] (0xE000 0E08 0800 0000)
; and
; ST d0, [immed24] (0xE000 0D88 0800 0000)
; is in 2nd highest part of instruction
; therefore base of 2nd highest part of insn passed in d2
; All of the funny extraction code below just forms the
    instruction
; CSP has particularly odd bit ordering for immediates
```

Extracting the lower 11-bits to d0 is performed in constructing the instruction as follows:

```
; extract lower 11 bits to d0
AND d0, r0, 0x07FF
OR d0, d0, 0xE000; merge with base instruction
; write to highest part of instruction
ST [csp_access_ins+6], d0
```

Extracting the middle 3-bits to d0 is now performed in constructing the instruction as follows:

```
; extract middle 3 bits to d0
AND d0, r0, 0x3800
; Shift left by 2
ADD d0, d0, d0
ADD d0, d0, d0
OR d0, d0, d2; merge with base instruction
; write to 2nd highest part of instruction
ST [csp_access_ins+4], d0
```

Next, extracting the upper 10-bits to d0 is performed in completing the instruction as follows:

```
; extract upper 10-bits to d0
2 bits from r0
AND d0, r0, 0xC000
; Shift right by 14—taken from cookbook
MOV d1, 14
BGENL d1, d1
MULI.x2.uu mac0, d0, d1; logical shift
MOV d0, mac0.hi
; 8-bits from r1
AND d1, r1, 0x00FF
; Shift left by 2
ADD d1, d1, d1
ADD d1, d1, d1
; Merge into d0
OR d0, d0, d1
OR d0, d0, 0x0800; merge with base instruction
; write to 2nd lowest part of instruction
ST [csp_access_ins+2], d0
RET
```

Next, the value to write from is retrieved from the stack. The new instruction is then accessed by a call to another procedure "csp_access_ins" which carries out the appropriate write and the "_csp_mem_write16" routine completes.

```
; The section below must sit in the lower 23 bits of
    memory
; if CSP is sat on a >24-bit data bus, or anywhere if CSP
    is
; on a <=24-bit bus
; The memory must be accessible through both program
    and
; data busses
.section .text
csp_access_ins:
.align 8
.long 0; lower 32-bits of insn
.long 0; upper 32-bits of insn
RET
```

FIG. 3 is a diagrammatic representation of an instruction format according to some implementations of the invention. Field 305 is an "opcode" field indicating what to do with the remaining part of the instruction. Field 305 may indicate "load," "add," "multiply and accumulate," etc. Field 305 may also indicate which addressing mode to use. In some implementations, field 305 is 6 or 7 bits in length.

In this example, operands 310, 315 and 320 follow opcode field 305. Operands 310, 315 and 320 are data values to be operated on. Those of skill in the art will appreciate that more or fewer operands may be used, according to the requirements of the instruction.

Field 325 includes an encoded address of a memory location to allow for immediate addressing (also known as "direct addressing"), as described above. In some implementations, field 325 is 24 bits long. Field 330 is reserved for additional instructions such as "add to next instruction," "read and store to memory," etc. The maximum size of field 330 depends on whether immediate addressing is used.

Figure 4:
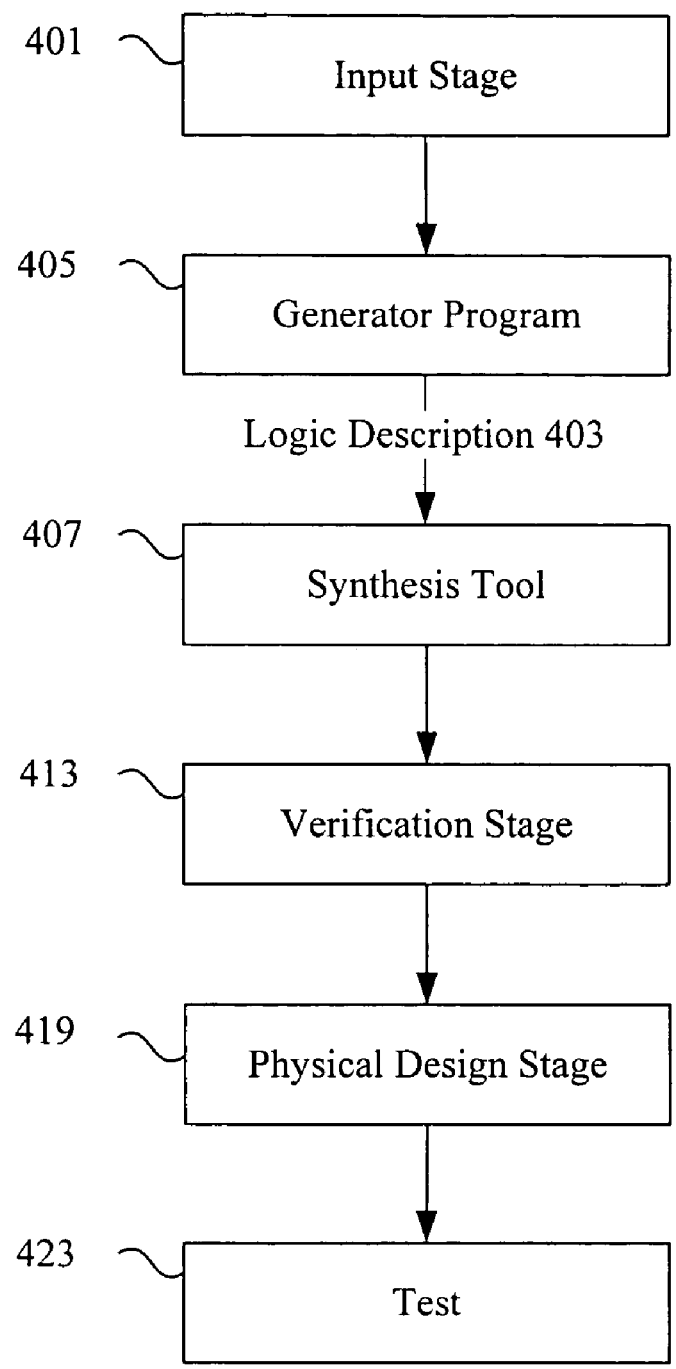
FIG. 4 is a flow chart outlining a method that may be used to implement some aspects of the invention.

FIG. 4 is a flow chart showing the implementation of one example of a programmable chip containing a processor that can run the program described above. An input stage 401 receives selection information, typically from a user for logic such as a processor core as well as other components to be implemented on an electronic device. A generator program 405 creates a logic description and provides the logic description along with other customized logic to any of a variety of synthesis tools, place and route programs, and logic configuration tools to allow a logic description to be implemented on an electronic device.

In one example, an input stage 401 often allows selection and parameterization of components to be used on an electronic device. In some examples, components provided to an input stage include intellectual property functions, megafunctions, and intellectual property cores. The input stage 401 may be a graphical user interface using wizards for allowing efficient or convenient entry of information. The input stage may also be a text interface or a program reading a data file such as a spreadsheet, database table, or schematic to acquire selection information. The input stage 401 produces an output containing information about the various components selected.

In typical implementations, the generator program 405 can identify the selections and generate a logic description 403 with information for implementing the various components. The generator program 405 can be a Perl script creating HDL files such as Verilog, Abel, VHDL, and AHDL files from the component information entered by a user. According to various embodiments, the generator program 405 also provides information to a synthesis tool 407 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 401, generator program 405, and synthesis tool 407 can be separate programs. The interface between the separate programs can be a database file, a log, or simply messages transmitted between the programs. For example, instead of writing a file to storage, the input stage 401 can send messages directly to the generator program 405 to allow the generator program to create a logic description. Similarly, the generator program can provide information directly to the synthesis tool instead of writing HDL files. Similarly, input stage 401, generator program 405, and synthesis tool 407 can be integrated into a single program.

A user may select various components and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 407.

A synthesis tool 407 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 413 typically follows the synthesis stage 407. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 413, the synthesized netlist file can be provided to physical design tools 419 including place and route and configuration tools. A place and route tool typically locates logic cells on specific logic elements of a target hardware device and connects wires between the inputs and outputs of the various logic elements in accordance with logic required to implement an electronic design. The device can also be physically tested at 423.

For programmable logic devices, a programmable logic configuration stage can take the output of the place and route tool to program the logic device with the user selected and parameterized components. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 401, the generator program 405, the synthesis tool 407, the verification tools 413, and physical design tools 419 are integrated into a single program. The various stages are automatically run and transparent to a user. The program can receive the user selected components, generate a logic description depicting logic for implementing the various selected components, and implement the electronic device. As will be appreciated by one of skill in the art, HDL files and EDF files are mere examples of a logic description. Other file formats as well as internal program representations are other examples of a logic description.

Figure 5:
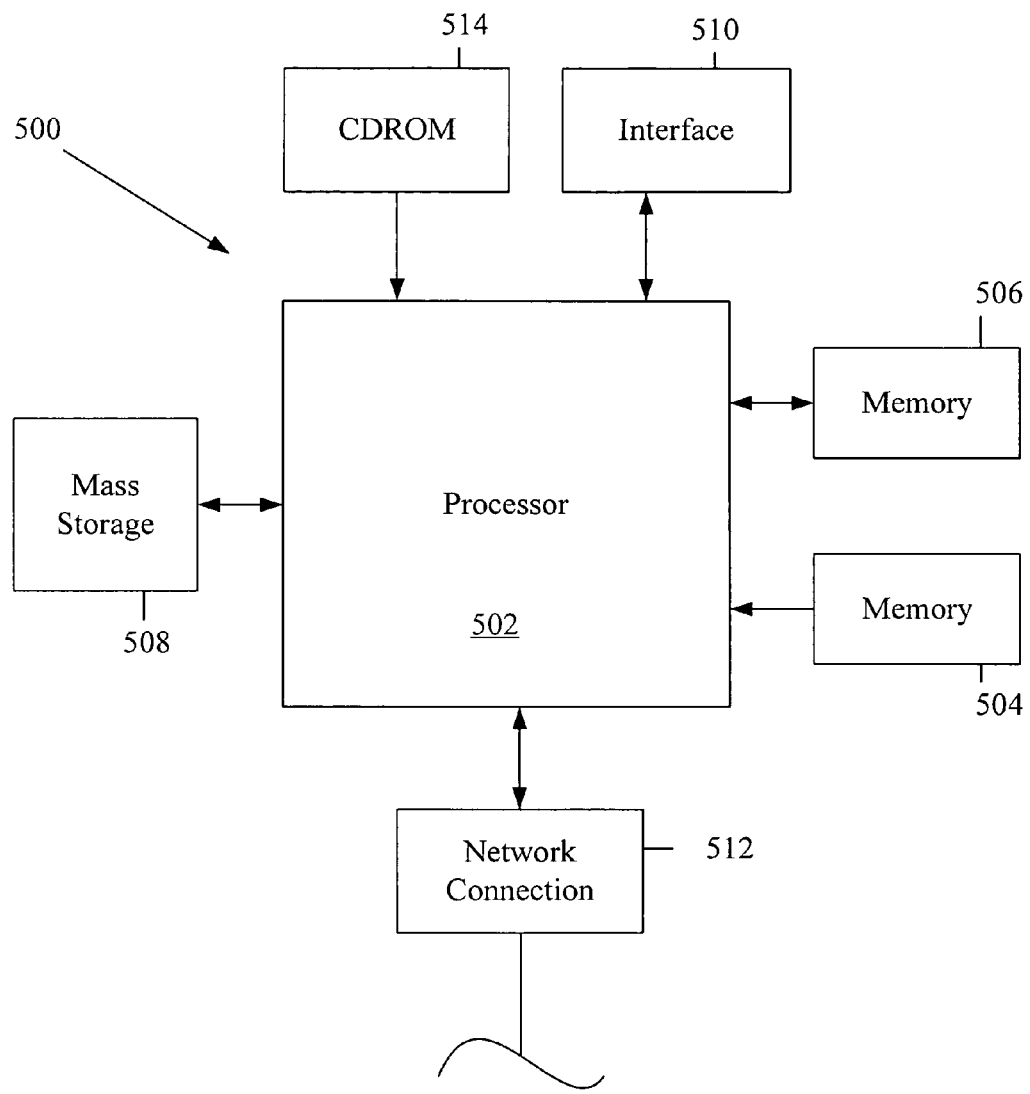
FIG. 5 is a diagrammatic representation of a computer system that can be used to implement some techniques of the present invention.

FIG. 5 illustrates a typical computer system that can be used to implement a programmable chip or to run a compiler to generate code of the present invention. The computer system 500 includes any number of processors 502 (also referred to as central processing units, or CPUs) that are coupled to devices including memory 506 (typically a random access memory, or "RAM"), memory 504 (typically a read only memory, or "ROM"). As is well known in the art, memory 504 acts to transfer data and instructions unidirectionally to the CPU and memory 506 is used typically to transfer data and instructions in a bi-directional manner.

Both of these memory devices may include any suitable type of computer-readable media. A mass storage device 508 is also coupled bi-directionally to CPU 502 and provides additional data storage capacity and may also include any suitable type of computer-readable media. The mass storage device 508 may be used to store programs, data and the like and is typically a secondary storage medium such as a hard disk that is slower than memory. The mass storage device 508 can be used to hold a library or database of prepackaged logic or intellectual property functions, as well as information on generating particular configurations. It will be appreciated that the information retained within the mass storage device 508, may, in appropriate cases, be incorporated in standard fashion as part of memory 506 as virtual memory. A specific mass storage device such as a CD-ROM 514 may also pass data uni-directionally to the CPU.

CPU 502 is also coupled to an interface 510 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps. It should be noted that the system 500 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 508 or 514 and executed on CPU 508 in conjunction with primary memory 506.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of different file formats, languages, and communication protocols and should not be restricted to the ones mentioned above. Therefore, the scope of the invention should be determined with reference to the appended claims.

I claim:

1. A programmable chip, comprising:
   a processor core;
   a plurality of address registers having a first bit width, the address registers being associated with the processor core on the programmable chip; and
   memory coupled to the processor core, the memory configurable to have an address space using a second bit width greater than the first bit width;
   an instruction format supported by the processor core that includes an address of a memory location having said second bit width, wherein the processor core is operable to use immediate addressing to access memory addresses having the second bit width upon generating an instruction during run time that uses said instruction format.

2. The programmable chip of claim 1, wherein immediate addressing is provided through use of an instruction set supported by the processor core.

3. The programmable chip of claim 2, wherein the instruction includes a plurality of fields, the instruction being generated at least in part by use of the instruction set.

4. The programmable chip of claim 1, wherein the first bit width is 16 bits and the second bit width is 24 bits.

5. The programmable chip of claim 1, wherein the memory includes data memory.

6. The programmable chip of claim 5, wherein the memory includes program memory.

7. The programmable chip of claim 1, further comprising:
   a plurality of second address registers having a third bit width, the second address registers being associated with the processor core.

8. The programmable chip of claim 7, further comprising:
   a first bus, a second bus, and a third bus for coupling the address registers having the first bit width, the memory having the second bit width, and the second address registers having the third bit width to the processor core respectively, wherein the widths of the first bus, the second bus, and the third bus are at least as large as the first bit width, the second bit width, and the third bit width respectively.

9. A method for accessing memory by a processor core, the method comprising:
   allocating space in memory that can be accessed by both program buses and data buses of the processor core;
   generating an instruction in the allocated space during run time, wherein the instruction includes an address of a memory location to be used for immediate addressing;
   executing the instruction using immediate addressing;
   determining whether the instruction is a read instruction or a write instruction; and
   returning data extracted by the instruction when the instruction is determined to be a read instruction.

10. The method of claim 9, wherein allocating space in memory includes allocating on-chip memory.

11. The method of claim 9, wherein allocating space in memory includes allocating an amount of space sufficient to contain a single read/write immediate instruction and a return instruction in order to allow execution to resume from a calling function.

12. The method of claim 9, wherein generating an instruction includes extracting said address from registers.

13. The method of claim 9, wherein generating an instruction includes constructing the instruction within an extended space read or write function.

14. The method of claim 9, wherein generating an instruction includes constructing the instruction with a plurality of fields.

15. The method of claim 14, wherein the fields are selected from the group consisting of an opcode, an operand, an immediate address, and an additional instruction.

16. The method of claim 9, further comprising:
   resuming execution at a point following a call to said instruction.

17. The method of claim 9, further comprising:
   determining whether the instruction is needed.

18. The method of claim 9, further comprising:
retrieving data to write from a stack when the instruction is determined to be a write instruction.

19. The method of claim 9, wherein the address of the instruction allows accessing a larger memory space than that which is available using address registers of the processor core.

20. A programmable chip, comprising:
a processor core;
a plurality of address registers having a first bit width, the address registers being associated with the processor core on the programmable chip; and
memory coupled to the processor core, the memory configurable to have an address space using a second bit width greater than the first bit width;
an instruction format supported by the processor core that includes an address of a memory location having said second bit width, wherein the processor core includes means for accessing memory addresses having the second bit width with an instruction generated during run time that uses said instruction format.

21. The programmable chip of claim 20, wherein the means is provided through use of an instruction set supported by the processor core.

22. The programmable chip of claim 21, wherein the instruction includes a plurality of fields, the instruction being generated at least in part by use of the instruction set.

23. The programmable chip of claim 22, wherein one of the fields includes an immediate value that corresponds to the address space.

24. The programmable chip of claim 20, wherein the first bit width is 16 bits and the second bit width is 24 bits.

25. The programmable chip of claim 20, wherein the memory includes data memory.

26. The programmable chip of claim 25, wherein the memory includes program memory.

* * * * *